Jan. 7, 1969
H. OSTERBERG
3,420,596
APPARATUS INCLUDING GUIDE PLATE MEANS AND MULTIPLE INTERNAL
REFLECTIVE PRISM MEANS FOR LAUNCHING AND TRANSMITTING
SURFACE-GUIDED OPTICAL WAVES
Filed March 5, 1965
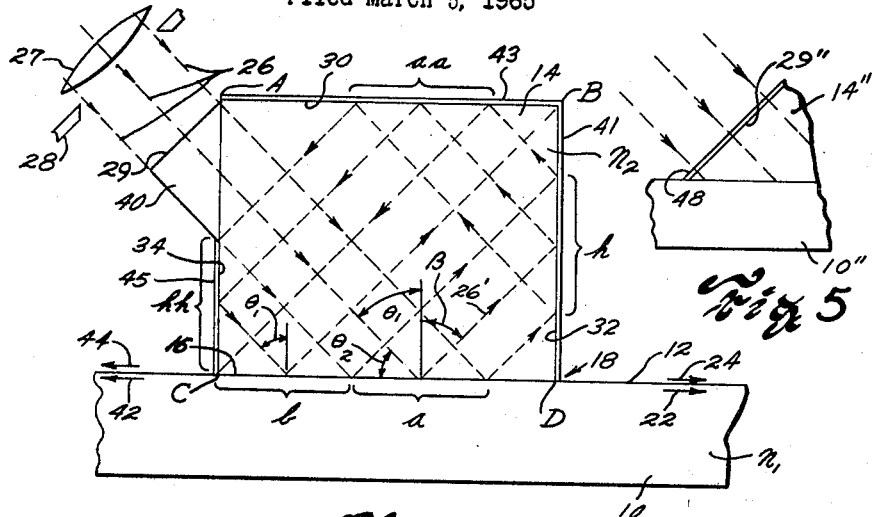
Fig. 1
Fig. 5
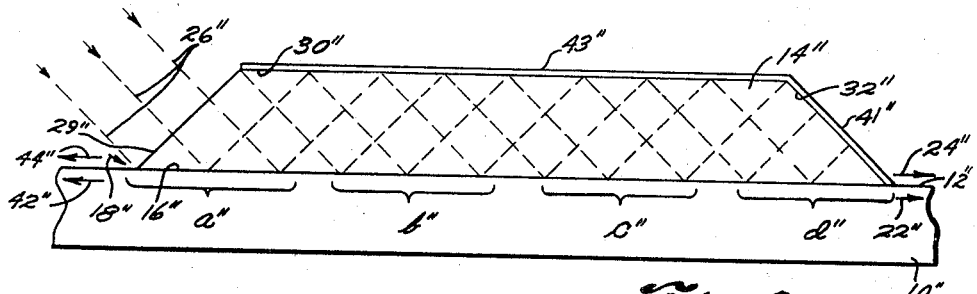
Fig. 3
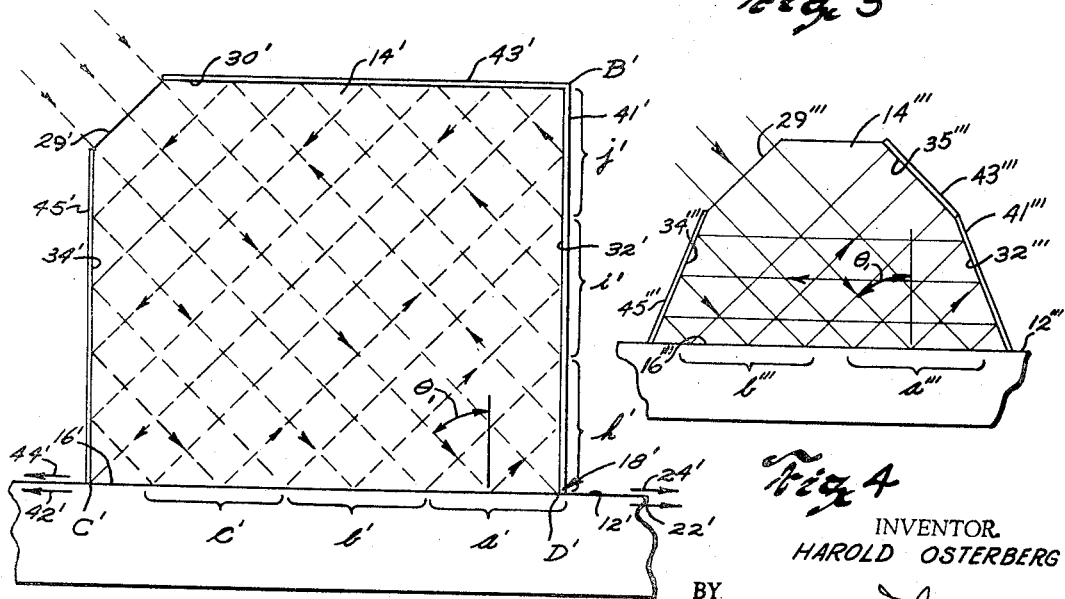
Fig. 2
Fig. 4
INVENTOR.
HAROLD OSTERBERG
BY
ATTORNEY

United States Patent Office 3,420,596
Patented Jan. 7, 1969

3,420,596
APPARATUS INCLUDING GUIDE PLATE MEANS AND MULTIPLE INTERNAL REFLECTIVE PRISM MEANS FOR LAUNCHING AND TRANSMITTING SURFACE-GUIDED OPTICAL WAVES
Harold Osterberg, Sturbridge, Mass., assignor to American Optical Company, Southbridge, Mass., a voluntary association of Massachusetts
Filed Mar. 5, 1965, Ser. No. 437,517
U.S. Cl. 350—96        12 Claims
Int. Cl. G02b *5/14;* G02b *27/14*

ABSTRACT OF THE DISCLOSURE

Optical apparatus including guide plate means of appreciable length having a guide-surface portion of higher refractive index value than that in the interior thereof and a multiple internal reflective prism means of even higher refractive index in contacting relation with said guide surface portion so as to repeatedly direct light toward the interface therebetween and cause part of said light to so pass into said guide plate means as to travel as surface guided optical waves along the guide surface portion thereof.

---

This invention relates to means for use in launching and transmitting optical energy, and more particularly to means for launching and transmitting optical energy in the form of surface-guided optical waves of increased strength as compared with surface-guided optical waves previously obtainable by use of known means. The invention also relates to means for enabling the simultaneous launching and transmitting of surface-guided optical waves in two different directions.

In copending application Ser. No. 255,493, filed Feb. 1, 1963, now abandoned, and assigned to the assignee of the instant application, there is disclosed an optical system which includes a guide plate of transparent material having a known refractive index in the interior thereof and extended relatively thin guide-surface portion thereon having a gradient in refractive index with its highest refractive index at the exposed surface of the plate and a prism of transparent material of a relatively higher predetermined refractive index than that at said exposed guide surface disposed in contact with the extended guide surface of said plate so as to form an optical interface therebetween, the optical design of the combination being such as to enable surface-guided optical waves to be launched and transmitted along said exposed surface of said plate when the interface is suitably illuminated by a beam of optical energy directed into said prism and incident at the launching surface of the prism and in predetermined angular relation thereto. When such is the case, surface-guided optical waves at near critical angle for a particular wavelength of the optical energy being employed will be launched in a predetermined direction along the extended surface of said guide plate. However, the amount of optical energy which could previously be so launched as surface-guided optical waves along such a guide surface was relatively small as compared to the total amount of energy being supplied to the optical system.

It has now been found that, by use of the improved optical system of the present invention, greatly improved results can be obtained insofar as the amount of optical energy which can be launched and transmitted as surface-guided optical waves are concerned. In fact, by use of such improved means, as much as several hundred percent increase in the total amount of energy being launched and transmitted can be obtained. Also, by use of the improved means, it is possible to transmit surface-guided optical waves of increased strength in two different directions along such an extended guide surface.

As will be seen from the description which follows, by careful design of the launching prism means of the improved optical system in relation to the guide plate thereof, not only may surface-guided optical waves be launched by optical energy being projected into the system and incident at the launching surface thereof but also a large part of the optical energy which is not at such time utilized as surface-guided waves may be so internally reflected within the prism means as to be again incident upon the launching surface, one or more times, and in such a way as to tend to materially supplement the initially launched surface-guided optical waves. In fact, the improved launching prism means may be so arranged as to provide any convenient number of unit launch surface areas desired each tending to launch surface-guided waves and with said unit areas being so related to each other that the individually launched "pieces" of surface-guided optical waves will jointly provide signals of materially increased strength.

A further consideration of the present invention is that the design and construction of the launching prism means may be such as to cause light travelling internally of said prism, and after several successive impingements upon unit launch areas of said launching surface, to be redirected back upon itself and caused to retrace its original path, thereby producing a second series of impingements at near critical angle upon the several different unit launch areas of said launching prism means, with the result that surface-guided optical waves may also be launched and caused to travel in a second opposite direction along said guide surface.

It is additionally possible in accordance with the teachings of the present invention to provide upon the entrance surface of the improved launching prism a highly reflecting coating and to accurately control the dimensions of the prism so that when the prism is illuminated by coherent monochromatic light of a predetermined wavelength, the total optical path length travelled by the internally reflected light within the prism from the entrance surface back to the entrance surface will just equal an integral number of wavelengths of this light and an optical resonant cavity structure will be effected which is capable of launching surface-guided optical waves of increased strength in opposite directions along the guide surface of the guide plate disposed in optical contact with said prism.

It is, accordingly, a principal object of the present invention to provide an improved optical system of the character described comprising an extended guide plate formed of transparent material of known refractive index characteristics, launching prism means formed of a transparent material of a relatively higher predetermined refractive index disposed in contact with a surface thereof so as to form an optical interface, and means for directing a collimated beam of light of a predetermined wavelength at nearly normal incidence into said prism means and in such a direction as to be incident at a unit launch area of said prism means at near critical angle, and with said prism means not only being of such proportions and optical design as to launch surface-guided optical waves at said unit launch area but also such as to affect subsequent internal reflections and one or more subsequent impingements of this reflected light upon additional unit launch areas of said prism means and thereby cause, in effect, a plurality of finite "pieces" of light to be launched and collectively provide surface-guided optical waves of materially increased strength.

It is also an object of the present invention to provide upon such an improved launching prism a specularly reflecting surface or surfaces which are so disposed relative to the path of the optical energy travelling within said prism, and after successive incidences at said unit launch areas thereof, as to be directed back upon itself and incident at successive unit launch areas at near critical angle and thereby cause surface-guided optical waves of increased strength to be likewise launched but transmitted in an opposite direction along the guide plate of said system.

It is also an object of the present invention to provide in a system of the character described a launching prism having a carefully controlled internal optical path length between opposed reflecting surfaces thereon which is equal to an integral number of wavelengths for the coherent optical energy being supplied to the prism as well as an additional reflecting coating of high reflectivity upon the entrance surface of said prism; with the result that an optical resonant cavity structure will be provided for the coherent optical energy and surface-guided optical waves of increased strength will be launched by said prism disposed in optical contact with the guide surface of the guide plate of said system and will travel in opposite directions therealong.

Other objects and advantages of the invention will become apparent from the detailed description which follows when taken in conjunction with the accompanying drawings in which:

FIG. 1 is a fragmentary side elevational view of an optical system embodying the present invention and showing improved prism means for use in launching surface-guided optical waves of increased strength;

FIG. 2 is a fragmentary side elevational view of an optical system much like that of FIG. 1 but showing a modified form of the invention;

FIG. 3 is a fragmentary side elevational view also much like that of FIG. 1 but showing another modified form of the invention;

FIG. 4 likewise shows a modified prism construction; and

FIG. 5 is a fragmentary side elevational view showing a modified form of construction.

Referring to the drawings in detail, it will be seen that there is shown in FIG. 1 a guide plate 10 formed of transparent material (glass or plastic) of a known refractive index $n_1$ and having an extended optically finished guide surface 12 formed thereon which, as described in said copending application 255,493, has a slightly higher index at its guide surface. Launching prism means 14 of improved optical design and having an optically finished launching surface 16 formed thereon is shown in contact with the guide surface 12 of plate 10 and in such a manner as to form an optical interface 18 therebetween.

Prism means 14 which has a higher predetermined refractive index $n_2$ than that of plate 10 and also that of the exposed guide surface thereof, is carefully controlled as to peripheral shape and geometric dimensions so that parallel light 26 (preferably monochromatic) projected into prism 14 through an entrance surface thereof and incident upon the launching surface 16 will illuminate a unit launch surface area of said launching surface. This unit launch area is indicated at $a$ and is at such an angle of incidence $\theta_1$ relative to the illumination beam as to cause light of a predetermined wavelength to pass through the interface 18 and travel at near grazing incidence along the guide surface 12, as suggested by the pair of arrows 22 and 24, shown respectively slightly above and slightly below guide surface 12.

Given a prism material of a refractive index $n_p$ and a guide plate of an index $n_g$, the angle of incidence $\theta_1$ for launching a surface-guided optical wave will fall near the value $$\sin \theta_1 = n_g/n_p$$

when $n_g$ is of a lesser refractive index value than $n_p$.

The parallel illumination beam indicated by dotted lines 26 is provided by collimation means 27 and stop means 28. Preferably, this light beam would be provided by a known form of monochromatic light source (not shown) but it should be kept in mind that a laser may very well serve as such a monochromatic collimated light source.

The prism 14, it will be noted, is so constructed and arranged that it has an entrance surface 29 formed as one of the peripheral surfaces thereof and this surface is so disposed that it is in substantially normal relation to the light rays passing into the prism therethrough. Preferably, the entrance surface 29 would be provided with an anti-reflection film in order to minimize reflection losses. The incident light beam at prism entrance surface 29 may be considered as an infinite wave front which is "clipped" at entrance surface 29 so that a "piece" of this wave front will be incident at the unit launch area $a$ and because it is a finite "piece" of an infinite wave front it will induce a surface-guided wave along guide surface 12.

The prism means 14 of FIG. 1 (which has its several corners indicated by letters A, B, C, and D) is of carefully controlled geometric dimensions. Not only is it controlled as to thickness, considered in a direction normal to the surface of the drawing, so as to allow an illumination beam of suitable size to enter through the entrance surface 29 thereof but also the prism has its length and height carefully controlled. The prism length, as indicated between the corners C and D, is carefully proportioned so as to provide not only the unit launch area $a$ but also any convenient number of similar unit launch areas, such as area $b$ as well. Also, note that in this particular prism design a length greater than the sum of such unit launch areas by an amount equal to one-half of a unit area is provided.

Prism means 14 has the general shape of a rectangle so as to present not only a second side 30 (disposed between corners A and B) in precisely parallel relation to the launching surface 16 but also third and fourth sides 32 and 34, respectively intersecting therewith and arranged in precisely parallel relation to each other; and all of these sides being in normal relation to the central plane of incidence of the illumination beam at interface 18. Furthermore, the sides 30, 32, and 34, like surface 16, are flat and optically finished.

It will be appreciated that in the arrangement of FIG. 1, the entrance surface 29, as shown, is disposed upon a second smaller prism 40 which has substantially the same high refractive index as that provided by prism 14. The small prism 40 may be fused, cemented or otherwise fixedly secured in known manner to the side surface 34 of prism 14 and arranged to present entrance surface 29 at substantially normal incidence to the entering light beam 26. While it might be possible to form these two prisms 14 and 40 as a single optical element, nevertheless, from a practical standpoint, it is preferred to form each separately and to subsequently secure them together. If a cement is used, it should have substantially the same refractive index as that of the prisms. Or, same could be fused together. As shown, sides 30 and 32 and that part of side 34 below prism 40 are coated, as indicated at 41, 43 and 45, so as to be 100% specularly reflecting.

Thus, the construction and arrangement in FIG. 1 is such that the beam of collimated light incident upon the unit launch surface area $a$ at angle of incidence $\theta_1$ will have a part of the energy thereof travel through interface 18 and induced to travel at near grazing incidence along the surface 12 of plate 10 while a second portion of said beam will be internally reflected at said interface. The reflected portion of the optical energy, as suggested by arrow 26', will impinge upon a side wall surface 32 at the unit area thereof indicated by the letter $h$. However, the dimension of side wall surface 32 of the prism between the corners B and D will be carefully controlled so as to be precisely equal to a desired number of these unit surface areas; which in the FIG. 1 arrangement will be just equal to the same whole number of surface areas as provided on the launching surface 16. In FIG. 1, the angle $\theta_1$ is taken equal to 45°. Other values such 40° and 60° for $\theta_1$ can be used.

When the prism construction is like that of FIG. 1, light which is first incident at unit area $a$ and thereafter reflected to be incident at unit area $h$ will be again reflected so as to impinge upon a unit surface area $aa$ of the top wall surface 30. Since the dimensions of the side walls of the prism are carefully controlled, it follows that the light impinging upon unit area $aa$ will thereafter be directed so as to impinge upon unit area $hh$ upon the side wall surface 34, before same is reflected and is caused to travel downwardly also at an angle $\theta_1$ to a second unit surface area $b$ on launching surface 16. At unit surface area $b$, some additional optical energy will be caused to pass through interface 18 and thereafter travel as a second "piece" of a surface-guided optical wave in the direction indicated by arrows 22 and 24 and will effect an increase in signal strength.

Even though, as shown in FIG. 1, prism 14 employs only two separate unit launch areas $a$ and $b$, nevertheless, it should be kept in mind that, as previously stated, the prism arrangement may be such as to provide any convenient number of unit launch areas desired and arranged to function in sequential relation to each other and thus give appreciably greater signal strength. As many as six, or eight, or even more unit launch areas are considered to be within reason.

In the construction shown in FIG. 1, it will be appreciated that a part of the light within the prism may be internally reflected four successive times after its initial reflection at area $a$ and before travelling directly towards the prism corner B. At this corner B, however, this energy will be reflected back upon itself in such a manner as to be caused to again experience an equal number of successive reflections before passing out of the prism through entrance surface 29. Since the angle $\beta$ is equal to angle $\theta_1$, the results of such an arrangement, are that not only are a plurality of separate "pieces" of surface-guided optical waves successively launched along the guide surface 12 of plate 10 in the direction of arrows 22 and 24 but also similar "pieces" of surface-guided optical waves are successively launched from these unit areas so as to travel along the guide surface 12 of plate 10 but in an opposite direction, as indicated by arrows 42 and 44. Nevertheless, it should be noted that both of these oppositely directed surface-guided optical waves will be of materially greater strength than has been possible, heretofore, by earlier known launching prisms.

Further inspection of FIG. 1 will show that the unit launch area $a$ is spaced from corner D a distance equal to one-half of the length of a single unit launch area. This is possible when both the launching prism 14 and the auxiliary prism 40 are being employed as shown. In FIG. 2, however, wherein a slightly different modified prism 14' is employed, the arrangement is such that a first unit launch area $a'$ is provided on the launching surface 16' immediately adjacent the prism corner D'. Successive unit launch areas are indicated at $b'$ and $c'$.

The side wall 32' of this prism in this instance is carefully controlled so as to provide between the prism corners B' and D' a number of unit surface areas $h'$, $i'$ and $j'$ just equal to the number of launch areas provided upon the launching surface 16'. Also, the upper surface 30' of the prism, in a like manner, is arranged to receive reflected light from each of the side wall unit surface areas, as are also unit surface areas on the side wall surface 34'.

Thus, it will be seen that in the modified arrangement of FIG. 2, light which enters launching prism 14' and is first reflected at the unit launch area $a'$ will thereafter experience three additional internal reflections before impinging upon the second unit launch area $b'$. As before, a part of this light will pass through interface 18' while a part will be internally reflected and will thereafter be incident upon unit launch surface $c'$. Thus, in a manner similar to that already described with reference to prism 14 of FIG. 1, light within the prism 14' internally reflected a sufficient number of times will eventually be directed toward a prism corner, in this case corner C, where it will experience a complete reversal in its direction of travel, and will thereafter be caused to re-trace its path through the prism and exit through entrance surface 29'.

The result is, accordingly, that not only will a relatively strong surface-guided optical wave be launched along a guide surface in a first direction, as indicated by arrows 22' and 24', but also a second relatively strong surface-guided optical wave will be launched in an opposite direction along the guide surface, as indicated by the arrows 42' and 44'.

One distinct advantage of the prism arrangement of FIG. 2 is that it may be made without undue difficulty from a single piece of material, care being exercised, of course, to make sure that the opposite flat finished surfaces thereof be accurately formed in parallel relation and proper spacing to each other. Specularly reflecting coatings are shown at 41', 43' and 45'.

In FIG. 3, a second modified form of launching prism construction is indicated at 14", same being provided with an entrance surface 29" and with lower and upper surfaces 16" and 30" which are accurately finished so as to be in parallel relation to each other. The parallel beam 26" is arranged to pass through surface 29" at substantially normal incidence and to impinge upon the optical interface 18" formed between the launch surface 16" of prism 14" and guide surface 12" of guide plate 10".

Thus, it is possible to launch a "piece" of a surface-guided optical wave in the direction indicated by arrows 22" and 24". Since a certain part of the light beam incident at the first unit launch area $a''$ will be internally reflected at this interface, it follows that this light, after reflection at upper surface 30" will again impinge upon launching surface 16" at a second unit launch area $b''$, and a second piece of a surface-guided optical wave will be launched at this location and the resulting signal will be of increased strength.

As indicated by areas $c''$ and $d''$, such a prism may be formed with as many successive unit launch areas as desired and each of these will contribute to the strength of the total signal being provided. Upper surface 30" and side wall surface 32" of this prism may be coated so as to be specularly reflecting as indicated at 41" and 43".

Thus, the surfaces of this prism 14" will be suitably disposed so that light incident upon sloping end wall 32" will be re-directed back upon itself and retrace its original path so as to exit at entrance surface 29". Thus, it is also possible, by use of a prism of such a construction, to launch surface-guided optical waves of increased strength and have same travel in two different directions, as indicated by arrows 22" and 24" and by arrows 42" and 44" respectively.

In the modified forms of prism constructions of FIGS. 1 and 2, the internally reflected light beam experiences three successive reflections after impinging upon a unit launch area and before reaching the next successive unit launch area. In FIG. 3, only a single such internal reflection occurs. In the modified arrangement of FIG. 4, however, the constructional arrangement is such that two reflections between successive unit launch areas occurs. In all cases, nevertheless, when precision is exercised in the production of the prism means, any convenient number of unit surface launch areas for providing signals of increased strength can be employed and specularly reflecting means can be provided for effecting signals in two different directions.

In FIG. 4, the modified prism means is indicated at

14′′′, the entrance surface at 29′′′, the first unit launch area at a′′′ and the second unit launch area at b′′′. Also, the pair of beam-reflecting surfaces are indicated at 32′′′ and 34′′′ and the surface for reversing the direction of the internal light beam is indicated at 35′′′. In this modification, it is preferable to have the structure so that the light beam between surfaces 32′′′ and 34′′′ travels in a direction parallel to the launching surface 16′′′. Surfaces 32′′′, 34′′′ and 35′′′ in this modification will be coated so as to be specularly reflective, as indicated at 41′′′, 43′′′ and 45′′′.

While the prism means of FIG. 1 and FIG. 2 are of rectangular shape and properly proportioned, it should be noted that a parallelepiped peripheral shape for the launching prism could also be used, if desired, and when likewise properly proportioned.

When desired, an additional advantageous result can be obtained by a prism structure much like that indicated in FIGS. 1, 2 and 3 but modified to provide a resonant cavity arrangement thereof.

In FIG. 3, for example, the entrance surface 29″ can be arranged so as to be precisely perpendicular to the path of the collimated illumination beam impinging thereon and this entrance surface can be coated, as indicated at 48 in FIG. 5, so as to be highly specularly reflective. (A coating having a reflectivity between 90 to 92% is preferred.) Also, the round trip optical path length of the monochromatic light travelled within the prism and between this reflecting surface 48 and coated reflecting surface 32″ can be made substantially equal to an integral number of wavelengths of this monochromatic light.

When such is the case and a coherent monochromatic light source, such as a laser, is employed, an optical resonant cavity will result. It follows then that if the distance between successive unit launch areas a″, b″, c″, etc. is constant and, at the same time, the distance properly proportioned so that the optical path difference between adjacent unit areas is just equal to an integral number of wavelengths of this light, not only will an optical resonant cavity structure result but also constructive interference will be produced and surface-guided optical waves of greatly increased strength will be launched in both directions along the guide surface of the associated guide plate.

In a like manner, the prism constructions of FIGS. 1 and 2 may be arranged so as to function as optical resonant cavities having launching surfaces for launching surface-guided optical waves of greatly increased strength in both directions.

It also follows from the foregoing description that an optical resonant cavity for launching surface-guided waves will be effected by a prism structure like that of FIG. 3 even if the number of unit launch areas is reduced to one; that is, even if this prism is of a simple triangular peripheral shape. This would be the simplest form of optical resonant cavity prism to manufacture since only one launching surface between the opposed reflecting surfaces need be provided. Nevertheless, such a simplified prism arrangement will provide, when all of the optical requirements are satisfied, a resonant cavity arrangement capable of launching surface-guided optical waves of materially increased strength.

It also follows that with reference to FIGS. 1 and 2, in a like manner, the number of unit surface areas can be reduced by reducing the dimensions of the prism, and even if reduced to only one unit area the structure will still function as an optical resonant cavity arrangement.

Having described my invention, I claim:

1. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a flat optically finshed launching surface formed thereon, said launching surface being disposed in contacting relation with said guide surface in such a manner as to form an optical interface therebetween, means for supplying a collimated beam of light of a predetermined wavelength to said prism, an entrance surface so located on said prism as to allow said beam to pass into said prism and to travel within said prism in such a direction as to impinge upon a first unit launch area of said launching surface at near critical angle for said predetermined wavelength, and to cause a part of said light to pass through said interface and be refracted at near grazing incidence along said guide surface as a surface-guided optical wave, and optically finished surface means formed on said prism in such relation to said first unit launch area as to receive light internally reflected at said first unit launch area and to direct same at near critical angle onto a second unit launch area of said launching surface, and to cause light at said predetermined wavelength to pass therethrough and travel at near grazing incidence along said guide surface in such a manner as to amplify said first surface-guided optical wave.

2. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a flat optically finished launching surface formed thereon, said launching surface being disposed in contacting relation with said guide surface in such a manner as to form an optical interface therebetween, means for supplying a collimated beam of light of a predetermined wavelength to said prism, an entrance surface so located on said prism as to allow said beam to pass into said prism and to travel within said prism in such a direction as to impinge upon a first unit launch area of said launching surface at near critical angle for said predetermined wavelength, and to cause a part of said light to pass through said interface and be refracted at near grazing incidence along said guide surface in a first direction as a surface-guided optical wave, optically finished surface means formed on said prism in such relation to said first unit launch area as to receive light internally reflected at said first unit launch area and to direct same at near critical angle onto a second unit launch area of said launching area, and to cause light at said predetermined wavelength to pass therethrough and travel at near grazing incidence along said guide surface in such a manner as to amplify said first surface-guided optical wave, and a specularly reflecting coating on a surface of said prism in the path of that part of the light beam which is internally reflected after impingement upon said second unit launch area, said reflecting coating being so disposed thereon as to cause the light beam received thereby to be reflected back upon itself and experience successive impingements at said unit launch areas and cause surface-guided optical waves to be launched in a second direction along the guide surface of said plate.

3. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a plurality of peripherally arranged surfaces formed thereon, one of said surfaces being a flat optically finished launching surface disposed in contacting relation with said guide surface in such a manner as to form an optical interface therebetween, means for supplying a collimated beam of light of a predetermined wavelength to said prism, a second one of said peripheral surfaces being an entrance surface so located on said prism as to allow said beam to pass into said prism and to travel within said prism in such a direction as to impinge upon a first unit launch area of said launching surface at near critical angle for said predetermined wavelength, and to cause a part of said light to pass through said interface and be refracted at near grazing incidence along said guide surface as a surface-guided optical wave, and at least one additional surface of said plurality of peripheral surfaces being disposed on said prism in such relation to said first unit launch area as to receive light internally reflected at said first unit launch area and to direct same at near critical angle onto a second unit launch area of said launching surface, and to cause light at said predetermined wavelength to pass therethrough and travel at near grazing incidence along said guide surface and in such a manner as to amplify said first surface-guided optical wave.

4. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a plurality of peripherally arranged surfaces formed thereon, one of said surfaces being a flat optically finished launching surface disposed in contacting relation with said guide surface in such a manner as to form an optical interface therebetween, means for supplying a collimated beam of light of a predetermined wavelength to said prism, a second one of said peripheral surfaces being an entrance surface so located on said prism as to allow said beam to pass into said prism and to travel within said prism in such a direction as to impinge upon a first unit launch area of said launching surface at near critical angle for said predetermined wavelength, and to cause a part of said light to pass through said interface and be refracted at near grazing incidence along said guide surface as a surface-guided optical wave, at least one additional surface of said plurality of peripheral surfaces being disposed on said prism in such relation to said first unit launch area as to receive light internally reflected at said first unit launch area and to direct same at near critical angle onto a second unit launch area of said launching surface, and to cause light at said predetermined wavelength to pass therethrough and travel at near grazing incidence along said guide surface and in such a manner as to amplify said first surface-guided optical wave and a specularly reflecting coating on a surface of said prism in the path of that part of the light beam which is internally reflected after impingement upon said second unit launch area, said reflecting coating being so disposed thereon as to cause the beam of light received thereby to be reflected back upon itself and experience successive impingements at said unit launch area and cause surface-guided optical waves to be launched.

5. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a flat optically finished launching surface formed thereon, said launching surface being disposed in contacting relation with said guide surface in such a manner as to form an optical interface therebetween, means for supplying a collimated beam of light of a predetermined wavelength to said prism, an entrance surface so located on said prism as to allow said beam to pass into said prism and to travel within said prism in such a direction as to impinge upon a first unit launch area of said launching surface at near critical angle for said predetermined wavelength, and to cause a part of said light to pass through said interface and be refracted at near grazing incidence along said guide surface as a surface-guided optical wave, and a second optically finished surface formed on said prism in parallel relation to said launching surface so as to receive light internally reflected at said first launch area and direct same at near critical angle onto a second unit launch area of said launching surface, and to cause light at said predetermined wavelength to pass therethrough and travel at near grazing incidence along said guide surface and in such a manner as to amplify said first surface-guided optical wave.

6. The combination defined in claim 5 wherein a specularly reflecting coating is provided on a peripheral surface portion of said prism in the path of that part of the light beam which is internally reflected after impingement upon said second unit launch area, said reflecting coating being so disposed on said prism as to cause the light beam received thereby to be reflected back upon itself and experience successive impingements at said unit launch areas, and cause surface-guided optical waves to be launched in a second direction along the guide surface of said plate.

7. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a plurality of peripherally arranged surfaces formed thereon, one of said surfaces being a flat optically finished launching surface disposed in contacting relation with said guide surface in such a manner as to form an optical interface therebetween, means for supplying a collimated beam of light of a predetermined wavelength to said prism, a second one of said peripheral surfaces being an entrance surface so located on said prism as to allow said beam to pass into said prism and to travel within said prism in such a direction as to impinge upon a first unit launch area of said launching surface at near critical angle for said predetermined wavelength, and to cause a part of said light to pass through said interface and be refracted at near grazing incidence along said guide surface as a surface-guided optical wave, a third peripheral surface on said prism in parallel relation to said launching surface, and fourth and fifth peripheral surfaces on said prism in parallel relation to each other, said third, fourth and fifth surfaces being so disposed on said prism as to receive light internally reflected at said first unit launch area and to direct same at near critical angle onto a second one of said unit launch areas, and to cause light at said predetermined wavelength to pass therethrough and travel at near grazing incidence along said guide surface and in such a manner as to amplify said first surface-guided optical wave.

8. The combination defined in claim 7 wherein a specularly reflecting coating is provided on a peripheral surface portion of said prism in the path of that part of said light beam which is internally reflected after impingement upon said second unit launch area, said reflecting coating being so disposed on said prism as to cause the light beam received thereby to be reflected back upon itself and experience successive impingements at said unit launch areas, and cause surface-guided optical waves to be launched in a second direction along the guide surface of said plate.

9. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate, said prism comprising a plurality of flat optically finished surfaces disposed in peripheral relation thereon, one of said peripheral surfaces serving as a launching surface for said prism and being disposed in contacting relation with said guide surface so as to form an optical interface therebetween, means for supplying a collimated beam of light of a predetermined wavelength to said prism, a second peripheral surface so located on said prism as to form an entrance surface for allowing said light beam to pass into said prism and to travel in such a direction within said prism as to impinge upon a unit launch area of said launching surface at near critical angle for said predetermined wavelength, and to cause a part of said light to pass through said interface and be refracted at near grazing incidence along said guide surface as a surface-guided optical wave, at least a pair of said peripheral surfaces being so disposed on said prism as to serially receive light internally reflected at said first unit launch area and to reflect same at near critical angle onto a second unit launch area of said launching surface, and to cause light at said predetermined wavelength to pass through said second unit launch area and travel at near grazing incidence along said guide surface and in such a direction and such a manner as to amplify said first surface-guided optical wave.

10. An optical system for use in launching and transmitting surface-guided optical waves, said system comprising a plate of transparent material having a predetermined refractive index in the interior thereof and an extended guide-surface portion at the exterior thereof, said guide-surface portion being relatively thin and having a gradient in refractive index which is higher than that in said interior and with its highest index at the guide surface, a launching prism formed of a transparent material of a relatively higher predetermined refractive index than that at the guide surface of said plate and having a flat optically finished launching surface formed thereon, said launching surface being disposed in contacting relation with said guide surface in such a manner as to form an optical interface therebetween, means for supplying a beam of coherent monochromatic light of a predetermined wavelength to said prism, an entrance surface on said prism for allowing said beam to pass into said prism and to travel within said prism in such a direction as to impinge upon said launching surface at an angle of incidence near the critical angle for said predetermined wavelength, and to cause a part of said light to pass through said interface and be refracted at near grazing incidence along said guide surface in a first direction as a surface-guided optical wave, said entrance surface being disposed in precisely perpendicular relation to the axis of the beam of light passing therethrough, a highly specularly reflecting coating on said entrance surface, optically finished surface means on said prism in such relation to said launching surface as to receive that part of said light beam which is internally reflected at said launching surface, said optically finished surface means being so disposed upon said prism as to direct the light beam received thereby back toward said launching surface at precisely the same angle of incidence as that of the light beam at its first impingement upon said launching surface, and thereby cause light at said predetermined wavelength to pass therethrough and travel at near grazing incidence in an opposite direction along said guide surface, and a second highly specularly reflecting coating on said optically finished surface means on said prism, the internal optical path length of said prism for the light travelling therein and successively reflected by coated surface portions of said prism being so chosen as to provide an optical resonant cavity for launching surface-guided optical waves of increased strength.

11. The combination defined in claim 10 wherein a plurality of reflecting surfaces are provided upon said prism and so arranged that the light beam travelling within said prism will be caused to successively impinge upon said launching surface a plurality of times at near critical angle before reaching said second highly specularly reflecting coating and being re-directed back upon itself.

12. The combination defined in claim 10 wherein a reflecting surface is provided upon said prism and so arranged in parallel relation to said launching surface that the light beam travelling within said prism will be caused to successively impinge upon said launching surface a plurality of times at near critical angle before reaching said second highly specularly reflecting coating and being re-directed back upon itself.

References Cited

UNITED STATES PATENTS

| | | | |
|---|---|---|---|
| 3,140,451 | 7/1964 | Fox | 331—94.5 |
| 3,177,759 | 4/1965 | Wilks | 350—286 X |
| 3,286,581 | 11/1966 | Acloque et al. | |
| 3,308,395 | 3/1967 | Sorokin | 331—94.5 |

JOHN K. CORBIN, *Primary Examiner.*

U.S. Cl. X.R.

350—173, 286